United States Patent [19]
Lechleider

[11] Patent Number: 5,440,594
[45] Date of Patent: Aug. 8, 1995

[54] METHOD AND APPARATUS FOR JOINT OPTIMIZATION OF TRANSMITTED PULSE SHAPE AND RECEIVER TIMING IN DIGITAL SYSTEMS

[75] Inventor: Joseph W. Lechleider, Mendham Township, Morris County, N.J.

[73] Assignee: Bell Communications Research, Inc., Livingston, N.J.

[21] Appl. No.: 164,508

[22] Filed: Dec. 9, 1993

[51] Int. Cl.$^6$ ............................................. H04L 7/00
[52] U.S. Cl. ................................. 375/354; 375/358
[58] Field of Search ................... 375/106, 109, 12, 24, 375/14, 58, 99, 60; 327/141; 328/72, 55, 63

[56] References Cited

U.S. PATENT DOCUMENTS

| | | | |
|---|---|---|---|
| 4,031,317 | 6/1977 | McClain et al. | 375/109 |
| 4,249,206 | 9/1993 | Appelbaum et al. | 375/109 |

OTHER PUBLICATIONS

Members of the Technical Staff Bell Telephone Laboratories, *Transmission Systems for Communications*, Fifth Edition, 1982, pp. 1438–1444.

J. Lechleider, A New Interpolation Theorem with Application to Pulse Transmission, *IEEE Transactions on Communications*, vol. 39, No. 10, Oct. 1991, pp. 1438–1444.

R. Courant, D. Hilbert "*Methods of Mathematical Physics,*" vol. 1, 1937, pp. 2, 49, John Wiley & Sons.

*Primary Examiner*—Stephen Chin
*Assistant Examiner*—Tesfaldet Bocure
*Attorney, Agent, or Firm*—Leonard Charles Suchyta; Stephen M. Gurey

[57] ABSTRACT

In digital transmission, the combination of transmitted pulse shape and receiver sampling time that maximizes the magnitude of the channel output pulse sample is determined. The transmitted pulse shape is represented as a linear combination of orthonormal functions. The coefficients that multiply each of the functions are determined by measuring at the receiver and transmitting back to the transmitter the response of the channel to each independently transmitted function at an approximation to the optimal sampling time. A pulse shape is formed using the calculated coefficients and is transmitted to the receiver where the timing of its maximum is determined, which represents a next approximation to the optimal sampling time. By repeating a plurality of times the processes of transmitting the functions, measuring at the receiver and transmitting back to the transmitter the responses at the approximation to the optimal sampling time, calculating the coefficients, transmitting a pulse, and determining a next approximation to the optimal sampling time from the timing of the maximum in the received pulse, the coefficients and optimal sampling time will converge.

12 Claims, 2 Drawing Sheets

METHOD AND APPARATUS FOR JOINT OPTIMIZATION OF TRANSMITTED PULSE SHAPE AND RECEIVER TIMING IN DIGITAL SYSTEMS

BACKGROUND OF THE INVENTION

This invention relates to digital communications, and more particularly to determining the combination of transmitted pulse shape and receiver sampling time that optimizes the magnitude of the digital channel output pulse sample.

As is well known, in amplitude-shift-keying (ASK) digital communications pulses are transmitted by a transmitter to a receiver, which then samples the received signal in each pulse time interval to determine what magnitude was actually sent by the transmitter. Generally, in each pulse time interval the same pulse shape is transmitted with different discrete amplitudes, each possible amplitude representing either a single bit or plural binary bits. For example, in each interval the maximum amplitude of the pulse can either be zero or a fixed value, A, in which case each pulse represents a binary "0" or "1". Alternatively, the maximum pulse value in an interval, $A_m$, can assume plural level values, in which case each level can represent more than one binary bit. Because of the various impairments such as noise that affect the transmission of pulses through a channel, the received pulse in each pulse time interval does not exactly duplicate the transmitted pulse in either shape or maximum magnitude. The receiver, in order to recover the underlying binary bit or bits that each pulse represents, samples the received pulse at some sampling instant within each pulse interval and from that sampled magnitude makes a decision as to what pulse magnitude was most likely transmitted. In the prior art, in order to provide greatest immunity to noise, the transmitted pulses are shaped to deliver the maximum energy to the receiver and are then sampled at the time at which the received pulse is a maximum. In the past, however, in order to suppress noise, channel bandwidth has generally been kept at the Nyquist bandwidth. When transmitting at this minimum bandwidth, the optimal pulse shape is controlled since there is only one pulse shape that transmits most of its energy through the minimum bandwidth channel, that pulse shape being the prolate spheroidal wave function. Non-optimal waveforms that are easy to generate and hence have been used in practical applications lose much of their energy when transmitted through the channel. These waveforms, therefore, are more susceptible to noise than the optimal pulse shape.

Recently it has been recognized that when the noise is colored rather than white, advantages may accrue in using a channel having a bandwidth greater than the Nyquist bandwidth. Specifically, with a wider bandwidth channel the correlation in the noise can be exploited to reduce noise in the receiver. With a wider bandwidth channel the flexibility exists for shaping the pulses for various purposes. These purposes include shaping a pulse to minimize loss through the channel, and shaping a pulse to maximize the output pulse value at a given time instant. Obviously, with a maximized pulse value at the sampling time, there will be a maximum signal-to-noise ratio and generally improved immunity to interference of various kinds.

Various approaches to pulse shaping for improved signal-to-noise performance have been taken in the prior art. These approaches either look for a pulse that has a local maximum at the sampling instant (see, e.g., *Transmission Systems for Communications*, Fifth Edition, Members of the Technical Staff Bell Telephone Laboratories, 1982, pp. 714–728), or alternatively, given a fixed sampling instant, select a "best" pulse for that sampling instant (see, e.g., J. Lechleider, "A New Interpolation Theorem with Application to Pulse Transmission", *IEEE Transactions on Communications*, Vol. 39, No. 10, Oct. 1991, pp. 1438–1444). The prior art, however, has not addressed the joint optimization of pulse shape and receiver sampling time that maximizes the magnitude of the channel output pulse sample.

SUMMARY OF THE INVENTION

Accordingly, an object of the present invention is to provide a method for determining a transmitted pulse shape that, for a given transmission channel, is greater than any other possible pulse at the sampling instant and is also maximal at that sampling instant.

In accordance with the present invention, that optimal pulse shape is determined prior to transmitting a data signal on the channel and may be periodically updated to compensate for changing channel conditions. The present invention determines the best combination of transmitted pulse shape and receiver sampling instant under a constraint on the transmitted pulse energy. Thus, no combination of pulse shape and sampling instant yields a greater received sample value than the determined combination, provided that the transmitted pulse has the same energy as the pulse shape determined.

The transmitted pulse is represented as a linear combination of functions $\{\theta_n\}$, which are each multiplied by a coefficient $a_n$ to form the output sum. It is mathematically shown that the coefficient set, $\{a_n\}$, that yields the optimal pulse at a receiver's optimal sampling instant, $t_o$, is a function of the channel response set, $\{\phi_n\}$, to the input set $\{\theta_n\}$ at that sampling instant, $t_o$. Since the optimal sampling instant, $t_o$, is not known a priori to data transmission, the transmitter first sends an impulse signal to the receiver, to determine the time within the pulse interval at which the impulse response is maximum. This time serves as a first approximation of the optimal sampling instant, $t_o$. The transmitter then transmits each $\{\theta_n\}$ to the receiver, which then determines each responsive $\{\phi_n\}$ at the just approximated sampling instant, $t_o$. The receiver, on a reverse channel, transmits back to the transmitter each $\{\phi_n\}$ at the first approximated sampling instant from which, at the transmitter, each coefficient in the set $\{a_n\}$ is determined. The transmitter then transmits the "best" pulse using these coefficients and the receiver, in response thereto, determines the sampling instant as that time at which the response is maximal. The transmitter then again transmits each $\{\theta_n\}$ to the receiver, which now determines each responsive $\{\phi_n\}$ at the second approximated optimal sampling instant. These new $\{\theta_n\}$ values at this newly approximated sampling instant are transmitted by the receiver back to the transmitter and each coefficient, $\{a_n\}$, is readjusted. The procedure is iterated a plurality of times until the difference between the coefficients determined in successive iterations is within a predetermined value. The optimal pulse shape to be transmitted by the transmitter is thus the linear combination of the set $\{\theta_n\}$ as multiplied by the last calculated coefficients $\{a_n\}$. The optimal sampling time at the receiver is that time, $t_o$, at which the response to the optimal pulse is maximal. The combination of no other pulse shape, comprising a linear combination of the the function set $\{\theta_n\}$, and no other sampling time yields a greater received sample value.

DETAILED DESCRIPTION

Figure 1:
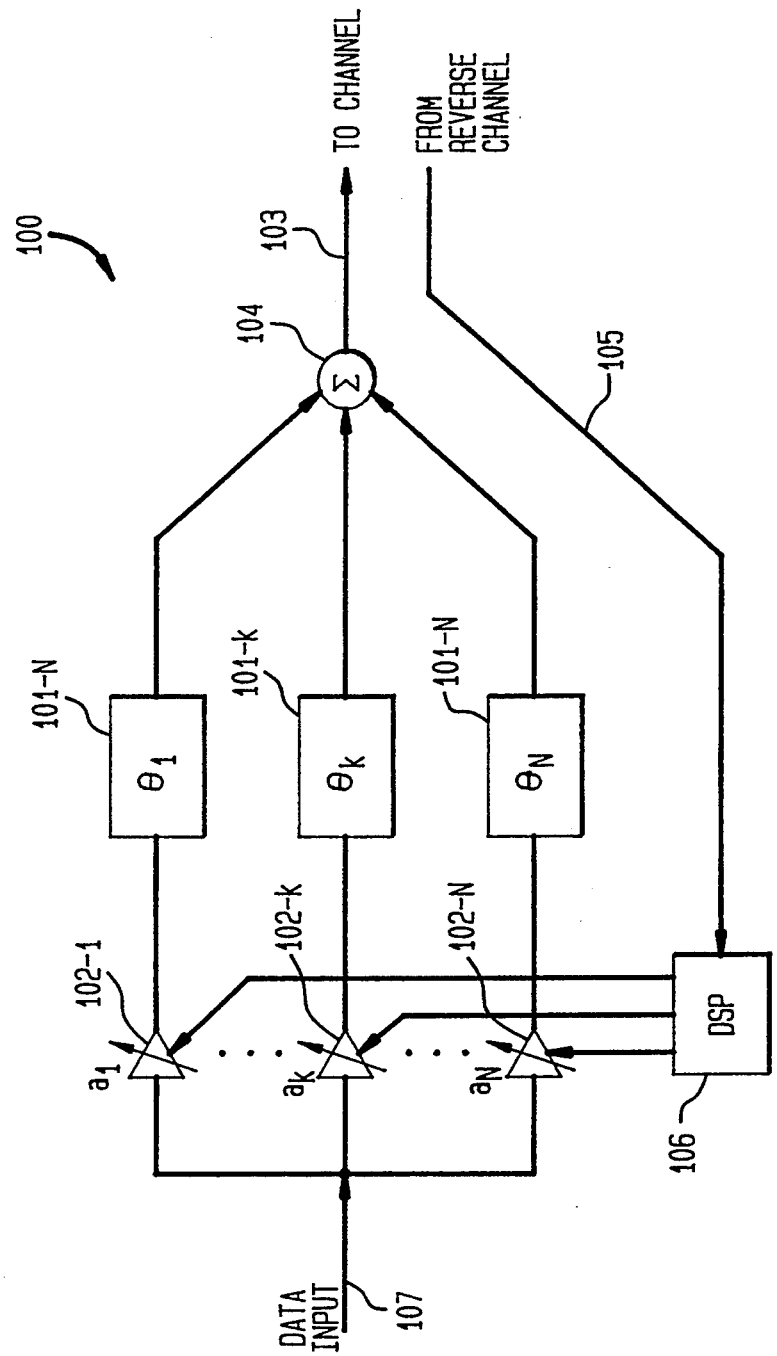
FIG. 1 is a block diagram of the transmitter in a communications system in accordance with the present invention.

The mathematical basis for the present invention is presented herein. It is assumed that the linear function space of all all possible transmitted pulse shapes is finite dimensional and is spanned by an orthonormal collection of functions $\{\theta_n\}$. Such functions could be sinusoids in a Fourier series, Bessel Functions, prolate spheroidal wave functions, etc. Thus, any transmitted pulse shape (s(t)) may be represented in the form $$s(t) = \sum_{n=1}^{N} a_n \theta_n(t) \quad (1)$$

where it is assumed that the transmitted pulse lies on the interval $0 \leq t \leq 1$. The orthonormality of the $\{\theta_n\}$ is most succinctly expressed in the following:

$$\int_0^1 \theta_n(t)\theta_m(t)dt = \delta_{mn} \quad (2)$$

where $\delta_{mn}$ is a kronecker delta. Consequently, the energy in s(t), which is designated by $E_s$, is given by $$E_s = \int_0^1 s(t)^2 dt = \sum_{n=1}^{N} a_n^2 \quad (3)$$

Thus, constraining the transmitted pulse energy to one, which is assumed, is the same as saying $$\sum_{n=1}^{N} a_n^2 = 1 \quad (4)$$

On transmission through a linear channel, the pulse s(t) becomes the received pulse r (t, a), given by $$r(t,a) = \sum_{n=1}^{N} a_n \phi_n(t) \quad (5)$$

where $\phi_n(t)$ is the channel response when it is driven by $\theta_n(t)$, and a is a vector with components $\{a_n\}$. The family $\{\phi_n(t)\}$ is not necessarily orthonormal or even orthogonal. However, it does represent a basis for the set of feasible channel outputs.

If the channel output is sampled at time $t_o$, the sampled value will be $r(t_o, a)$. The transmitted pulse shape that maximizes $r(t_o)^2$ is the optimal pulse shape for that receiver's sampling instant. Thus, the best collection of coefficients, $\{a_n\}$ would maximize $r(t_o)^2$.

By the well known Schwartz inequality (see, e.g., R. Courant and D. Hilbert, *Methods of Mathematical Physics*, Vol 1, 1937 and 1953, p. 2 & p. 49), $$r(t_o,a)^2 = \left(\sum_{n=1}^{N} a_n \phi_n(t)\right)^2 \leq \sum_{n=1}^{N} a_n^2 \sum_{n=1}^{N} \phi_n(t_o)^2 \quad (6)$$

Equality is achieved in equation (6) when $$a_n = \lambda \phi_n(t) \quad (7)$$

where $\lambda$ is a constant independent of n. Furthermore, satisfaction of the transmitted energy constraint, equation (4), leads to the conclusion that $$\lambda = \frac{1}{\left(\sum_{n=1}^{N} \phi_n(t_o)^2\right)^{\frac{1}{2}}} \quad (8)$$

Thus, the coefficients that maximize the received and sampled pulse magnitude subject to a transmitted energy constraint ($\hat{a}_n(t_o)$), are given by $$\hat{a}_n(t_o) = \frac{\phi_n(t_o)}{\left(\sum_{n=1}^{N} \phi_n(t_o)^2\right)^{\frac{1}{2}}} \quad (9)$$

The transmitted pulse shape that is optimized for sampling the received pulse at $t_o$ is thus $s(t, t_o)$, given by $$s(t,t_o) = \frac{\sum_{n=1}^{N} \phi_n(t_o)\theta_n(t)}{\left(\sum_{n=1}^{N} \phi_n(t_o)^2\right)^{\frac{1}{2}}} \quad (10)$$

and the corresponding output pulse is $p(t, t_o)$, given by $$p(t,t_o) = \frac{\sum_{n=1}^{N} \phi_n(t_o)\phi_n(t)}{\left(\sum_{n=1}^{N} \phi_n(t_o)^2\right)^{\frac{1}{2}}} \quad (11)$$

The value of the received sample at $t_o$ is, when the optimal transmitted pulse shape is used, $$e(t_o) = p(t_o,t_o) = \left(\sum_{n=1}^{N} \phi_n(t_o)^2\right)^{\frac{1}{2}} \quad (12)$$

which result is obtained directly from equation (11). The symbol $e(t_o)$ is used in equation (12) because e is the envelope of all output pulse shapes when the input pulse energy is less than or equal to one, when this envelope is maximal. The optimal sampling instant is obviously that which maximizes $e(t_o)$. It is known that $e(t_o)$ is extremal or stationary when $$\frac{de(t_o)}{dt_o} = 0 \quad (13)$$

or, equivalently, when $$\sum_{n=1}^{N} \phi_n(t_o)'\phi_n(t_o) = 0 \qquad (14)$$

where $\phi_n(t_o)'$ is the derivative of $\phi_n(t_o)$ with respect to $t_o$. This is just the condition that the optimal received pulse, $p(t, t_o)$, should be extremal at the instant that it was optimized for. But this is obvious; if the optimal pulse were not maximal at the sampling instant there would be a better sampling instant.

It should be noted that the condition given by equation (14) is necessary, but not sufficient to insure maximality. This condition indicates local maxima, minima, or points of inflection; which of the three conditions prevails can be determined by taking second derivatives or by computation of nearby values of the envelope. Also, there is likely to be more than one maximum. This suggests that the value of the sample might be calculated at each point where equation (14) is satisfied and the results ordered. The maximum of the finite set of values for the times at which equation (14) is satisfied will then yield the global maximum for the samples on the interval.

A transmitter 100 which forms the optimal pulse shape is illustrated in FIG. 1. It is assumed that a collection of filters, 101-1-101-N, that have impulse responses that are functions in the orthonormal basis set are available. As aforenoted, these might, for example, be sinusoidal functions that could used to form a Fourier series, or Bessel functions. Any set of basis functions can be formed by driving FIR filters at a much higher rate than the channel baud rate and shaping the functions by suitable selection of tap weights. Filters 101-1-101-N can thus be passive analog networks or can be FIR filters. It is reasonable to assume that any transmitted pulse that gets a substantial amount of energy through the channel can be realized by using only a finite number of the basis functions in linear combination. This will certainly be the case when the basis functions are sinusoids and the channel is band-limited. The filters 101-1-101-N, having impulse response basis functions $\{\theta_n(t)\}$, are driven by amplifiers 102-1-102-N, respectively, that have variable gains that are adjusted so that the transmitter 100 produces a linear combination of the $\{\theta_n(t)\}$ that approximates the optimal pulse shape in accordance with equation (10). The tap gains, $\{a_n\}$, of the amplifiers 102-1-102-N are adaptively set as will be described in detail hereinbelow. Each of the variable gain amplifiers 102-1-102-N is driven by the data value on input 107 that is to be transmitted onto channel 103 to the receiver at the channel output. When that value is S, the transmitter in FIG. 1, forms the pulse $s(t)$ at the output of adder 104, which is given by equation (1) hereinabove. From a reverse channel 105 from the receiver that is input to digital signal processor (DSP) 106, and as will be described, transmitter 100 "knows" sample values of what each of the $\{\theta_n(t)\}$ become on transmission through channel 103. Using the adaptation algorithm to be described, the transmitter adapts so that, for each n, the tap gain of each amplifier 102-1-102-N is given by equation (9), thus optimizing the pulse shape given by equation (1). Specifically, reverse channel 105, which may be an overhead channel that is separate from a reverse communications channel, supplies DSP 106 with the values of each $\{\phi_n(t)\}$ at one time, $t_o'$, during the pulse interval. These $\{\phi_n(t_o')\}$ are used by DSP 106 to calculate the coefficients $\{a_n\}$. Through the adaptation process to be described, the optimal sampling time, $t_o$, will eventually be determined and the responses to each $\{\theta_n(t)\}$ at $t_o$, $\{\phi_n(t_o)\}$, are transmitted on the reverse channel by the receiver. The coefficients $\{a_n\}$ for the optimal pulse can then be calculated by DSP 106 at the transmitter.

Figure 2:
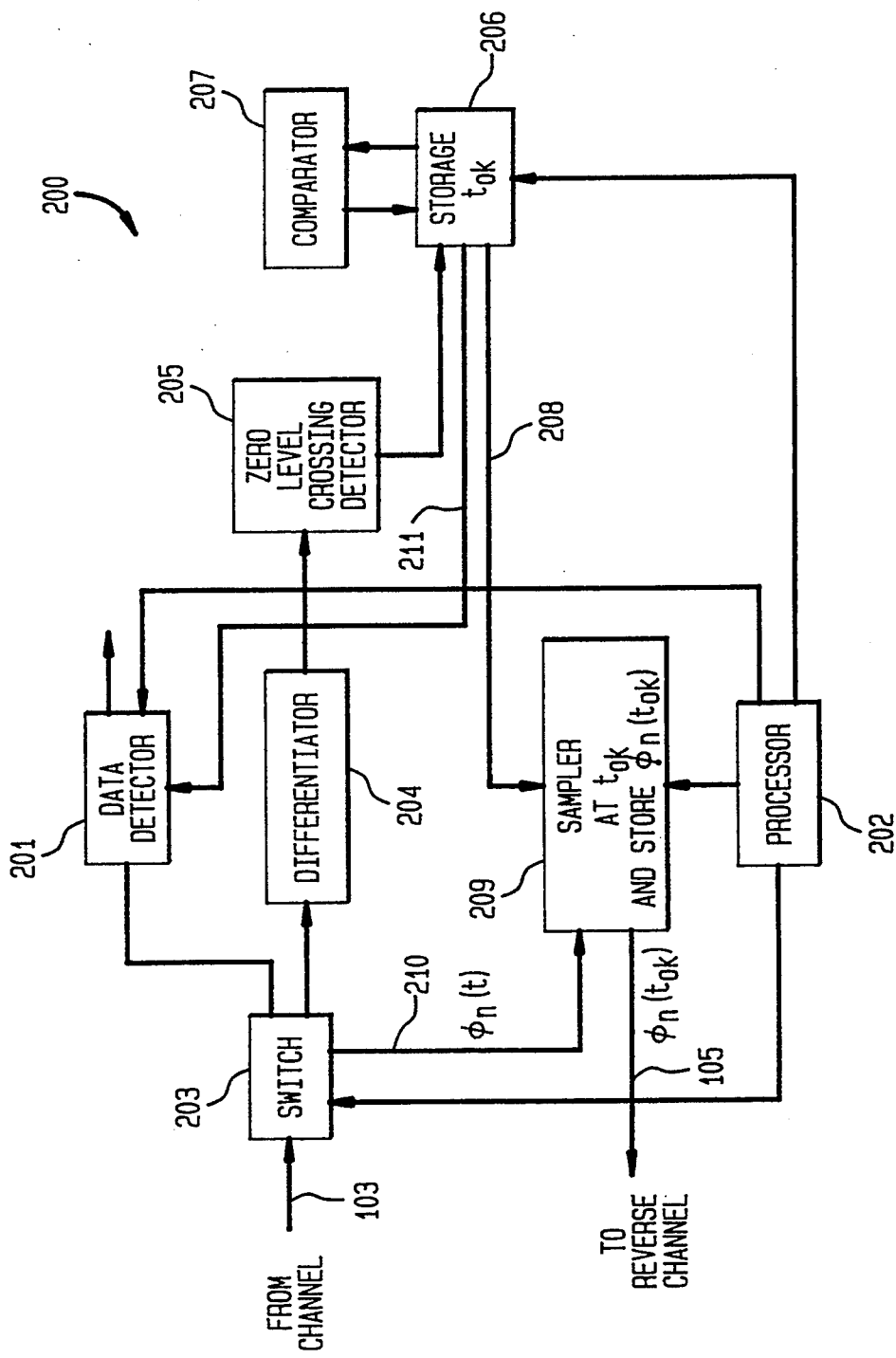
FIG. 2 is a block diagram of the receiver corresponding to the transmitter in FIG. 1 in a communications system in accordance with the present invention.

The receiver 200 that corresponds to transmitter 100 is shown in FIG. 2. It can be assumed that receiver 200 includes a front-end filter (not shown) that whitens the noise in a customary fashion. The channel may then be viewed as including the whitening filter so that optimization of the transmitted pulse does not have to take into account the shape of the noise spectrum. The receiver includes a data detector 201, which during normal data transmission periods detects the transmitted pulses from the received signal $s_o(t)$ on channel 103 at the optimal sampling time $t_o$. This optimal sampling time is supplied to detector 201 from a processor 202 which determines the pulse sampling time during the pulse optimization period of the channel. Processor 202 also controls switch 203 during the pulse optimization period, switching the incoming signal on channel 103 to data detector 201 after the optimal transmitter pulse shape and sampling time have been determined.

Since the optimal sampling time, $t_o$, at which to measure each $\{\phi_n(t)\}$ is not initially known, the adaptation process is initialized by transmitter 100 transmitting an impulse, or something approximating an impulse (with one unit of energy), to the receiver 200. At this phase of adaptation, processor 202 controls switch 203 to output the received channel impulse response to the input of a differentiator 204 for the purposes of finding the local maxima of the received pulse. The output of differentiator 204 is input to a negative-going zero level crossing detector 205, which could be simply a rectifier followed by a differentiator. The times and the corresponding pulse heights at each instant of level crossing are input to a storage device 206. Comparator 207 then compares all the local maxima in pulse height and selects the largest among them. Storage 206 then outputs on lead 208 the time of the maximum pulse height, which then serves as an initial approximation, $t_{oi}$, to the optimal sampling time.

Once the first approximation to the optimal sampling time is determined, transmitter 100 sequentially and individually transmits each of the functions within the set $\{\theta_n(t)\}$. At the receiver 200, processor 202 controls switch 203 so that each individual responsive $\phi_n(t)$ is input to sampler 209 on lead 210 and is sampled at time $t_{oi}$, which has been provided to sampler 209 on lead 208. Sampler 209 then transmits back to transmitter 100 on reverse channel 105 the set $\{\phi_n(t_{oi})\}$. DSP 106 in transmitter 100, upon receiving this set, calculates the set of coefficients $\{a_n\}$ in accordance with equation (9). The gains of amplifiers 102-1-102-N are then set and transmitter 100 transmits a test pulse or pulses to the receiver. Switch 203 is controlled by processor 202 to output the received channel signal to differentiator 204, which with zero level crossing detector 205, storage 206 and comparator 207, again together determine the time of the maxima in the received pulse. This time, $t_{o1}$, which is output by storage 206 on lead 208, serves at a new approximation to the optimal sampling time for sampler 209. Transmitter 100 thence transmits the set $\{\theta_n\}$, and the responsive set $\{\phi_n\}$ are sampled at receiver 200 by sampler 209 at $t_{o1}$. These samples, $\{\phi_n(t_{o1})\}$, are transmitted back to transmitter 100 on reverse channel 105, from which a new set of coefficients, $\{a_n\}$ are calculated. A new pulse is formed at transmitter 100, and transmitted to receiver 200. The next approximation to the optimal sampling time, $t_{o2}$, is found; the set $\{\theta_n\}$ is transmitted; the responsive set $\{\phi_n\}$ at $t_{o2}$ is sampled and transmitted back to transmitter 100; and new coefficients, $\{a_n\}$, are calculated.

These processes are iterated a plurality of times until the differences between the coefficients, $\{a_n\}$, determined in successive iterations are within a predetermined value. Specifically, the processes are iterated until the sum of the squares of the differences of corresponding individual coefficients in successive iterations is within a predetermined value. Alternatively, the processes can be repeated a plurality of times until the optimal sampling times determined in successive iterations is within a predetermined value. Once the coefficient set, $\{a_n\}$ is finally determined, the optimal pulse shape is defined and the optimal sampling time, $t_o$, is that time, $t_{ok}$, determined from the last iterative process. Processor 202 then directs storage 206 to provide that time to data detector 201 via lead 211. Processor 202 thence directs switch 203 to output received data transmissions to detector 201.

Although joint pulse and timing optimization can generally be performed as an initialization technique on a regular basis, or at the beginning of each data transmission, the processes could also periodically interrupt an ongoing data transmission to update the pulse shape and sampling time to compensate for changing channel conditions.

Although the previous discussion has assumed that the set of functions, $\{\theta_n\}$, that are linearly combined to form the pulse shape is an orthonormal set, such is not a requirement of the present invention. An orthonormal set is only one class of functions that can be combined for pulse shaping and linear combinations of other classes of functions can also be used. For a set of functions from another class, the optimal pulse shape and sampling time can be derived as a linear combination of the functions. Thus, the response of the channel to an impulse would initially be found from which an initial estimate of the optimal sampling time is determined. Each of the functions within the set is then separately transmitted and the response at the receiver at the first estimate of the sampling time is determined. These responses are transmitted back to the transmitter and a first estimate of the multiplicand coefficients for each function in the set are calculated. Unlike, however, the orthonormal set whose equations were derived hereinabove, for a non-orthonormal set the derivation of the coefficients for the optimal pulse shape are determined by the particular class of functions from which the function set is a subset.

The above-described embodiment is illustrative of the principles of the present invention. Other embodiments could be devised by those skilled in the art without departing from the spirit and scope of the present invention.

What is claimed is:

1. A method in a digital system of jointly determining an optimal receiver pulse sampling time and a transmitter pulse shape that is a linear combination of a plurality of predetermined wave functions, comprising the steps of:

(a) individually transmitting each of the plurality of predetermined wave functions to the receiver;
   (b) sampling the response at the receiver to each of the individually transmitted plurality of predetermined wave functions at an initially selected sampling time;
   (c) transmitting back to the transmitter the values of the sampled responses to each of the individually transmitted plurality of predetermined wave functions of step (b);
   (d) calculating a set of coefficients by which to multiply each of the plurality of predetermined wave functions to form a transmitter pulse shape from the values of the sampled responses to each of the individually transmitted plurality of predetermined wave functions at the initially selected sampling time;
   (e) transmitting a pulse to the receiver with a transmitter pulse shape determined from the set of calculated coefficients multiplied by the plurality of predetermined wave functions;
   (f) determining the time at the receiver at which the pulse transmitted in step (e) is a maximum;
   (g) again individually transmitting each of the plurality of predetermined wave functions to the receiver;
   (h) sampling the response at the receiver to each of the individually transmitted plurality of predetermined wave functions of step (g) at the time determined in step (f);
   (i) transmitting back to transmitter the values of the sampled responses to each of the individually transmitted plurality of predetermined wave functions of step (h) ;
   (j) calculating a set of coefficients by which to multiply each of the plurality of predetermined wave functions to form a transmitter pulse shape from the values of the sampled responses to each of the individually transmitted plurality of predetermined wave functions at the time determined in step (f);
   (k) repeating steps (e) through (j) a plurality of times until the coefficients determined in step (j) in successive iterations converge.

2. The method of claim 1 wherein the predetermined wave functions are orthonormal.

3. The method of claim 1 wherein steps (e) through (j) are repeated a plurality of times until the coefficients calculated in step (j) in successive iterations are within a predetermined difference.

4. The method of claim 1 wherein steps (e) through (j) are repeated a plurality of times until the sum of the squares of the differences between corresponding coefficients calculated in step (j) in successive iterations is less than a predetermined value.

5. The method of claim 1 further comprising the steps of initially transmitting an impulse, determining the time at the receiver at which the response to the impulse is a maximum, and using the time at which the response to the impulse is a maximum as the initial selected sampling time in step (b).

6. A method in a digital system of jointly determining an optimal receiver pulse sampling time and a transmitter pulse shape that is a linear combination of a plurality of predetermined wave functions, comprising the steps of:

(a) individually transmitting each of the plurality of predetermined wave functions to the receiver;
   (b) separately sampling the responses at the receiver to each of the individually transmitted plurality of predetermined wave functions at a possible sampling time;

(c) transmitting back to the transmitter the values of the sampled responses to each of the individually transmitted plurality of predetermined wave functions of step (b);

(d) calculating a set of coefficients by which to multiply each of the plurality of predetermined wave functions to form a transmitter pulse shape from the values of the sampled responses to each of the individually transmitted plurality of predetermined wave functions at the possible sampling time;

(e) transmitting a pulse to the receiver with a transmitter pulse shape determined from the set of coefficients calculated in step (d) and multiplied by the plurality of predetermined wave functions;

(f) determining as a next possible sampling time the time at the receiver at which the pulse transmitted in step (e) is a maximum; and (g) repeating steps (a) through (f) a plurality of times using the as the possible sampling time the next possible sampling time just determined in step (f) until the coefficients determined in step (d) in successive iterations converge.

7. The method of claim 6 wherein steps (a) through (f) are repeated a plurality of times until the coefficients calculated in step (d) in successive iterations are within a predetermined difference 8. The method of claim 6 wherein steps (a) through (f) are repeated a plurality of times until the sum of the squares of the differences between corresponding coefficients calculated in step (d) is less a predetermined value.

9. The method of claim 6 wherein the predetermined wave functions are orthonormal.

10. The method of claim 6 further comprising the steps of initially transmitting an impulse, determining the time at the receiver at which the response to the impulse is a maximum, and using the time at which the response to the impulse is a maximum as the possible sampling time the first time step (b) is performed.

11. In a digital transmission system which transmits pulses between a transmitter and a receiver, apparatus for jointedly determining the optimal receiver pulse sampling time and transmitter pulse shape that is a linear combination of a plurality of predetermined wave functions, comprising, at the transmitter:

means for separately transmitting each of the plurality of predetermined wave functions;

means for calculating a set of coefficients by which to multiply each of the plurality of predetermined wave functions to form a transmitter pulse shape from a set of values of the responses at the receiver to the separately transmitted plurality of predetermined wave functions at a possible sampling time; and means for transmitting a test pulse to the receiver with a shape determined from the set of calculated coefficients multiplied by the plurality of predetermined wave functions; and at the receiver:

means for sampling the response to each of the plurality of predetermined wave functions at the possible sampling time;

means for transmitting back to the receiver the values of the responses to each of the plurality of predetermined wave functions at the possible sampling time; and means for determining the time at which the test pulse transmitted by the transmitter to the receiver is a maximum to determine a new possible sampling time.

12. Apparatus in accordance with claim 11 wherein the predetermined wave functions are orthonormal.

* * * * *